Aug. 24, 1926.
R. R. MILLER
TRACTOR WHEEL
Filed Oct. 3, 1923
1,597,454
3 Sheets-Sheet 3
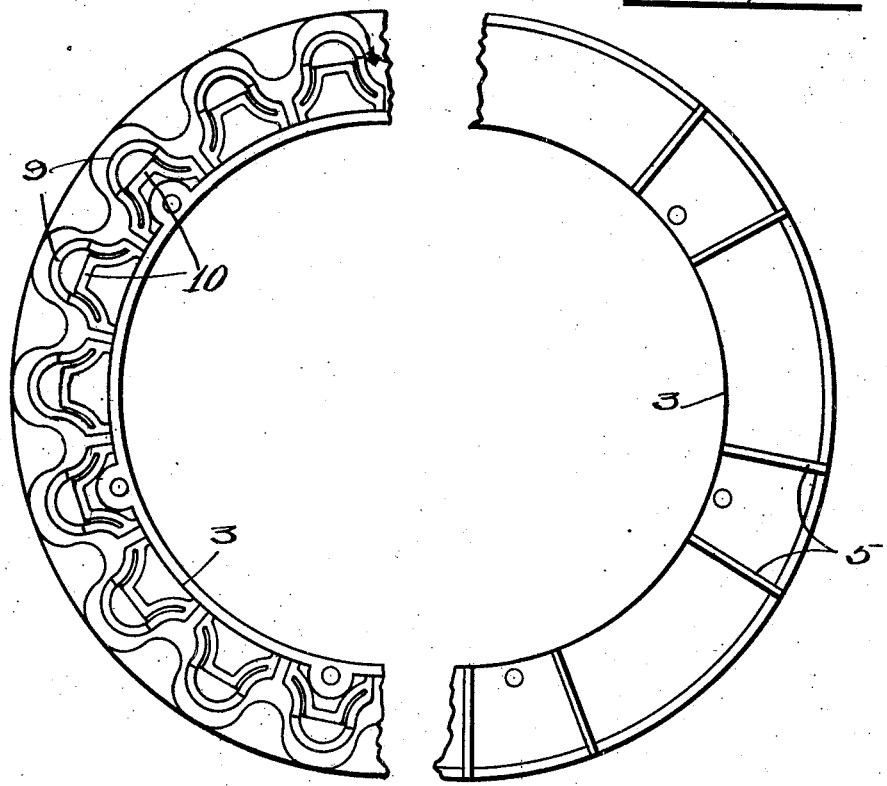
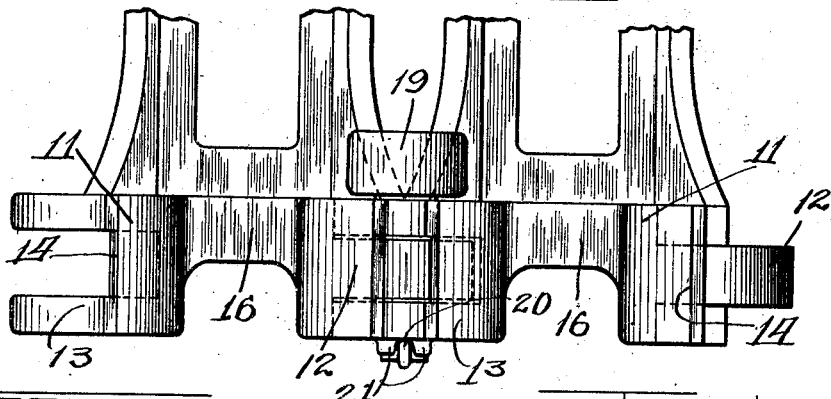

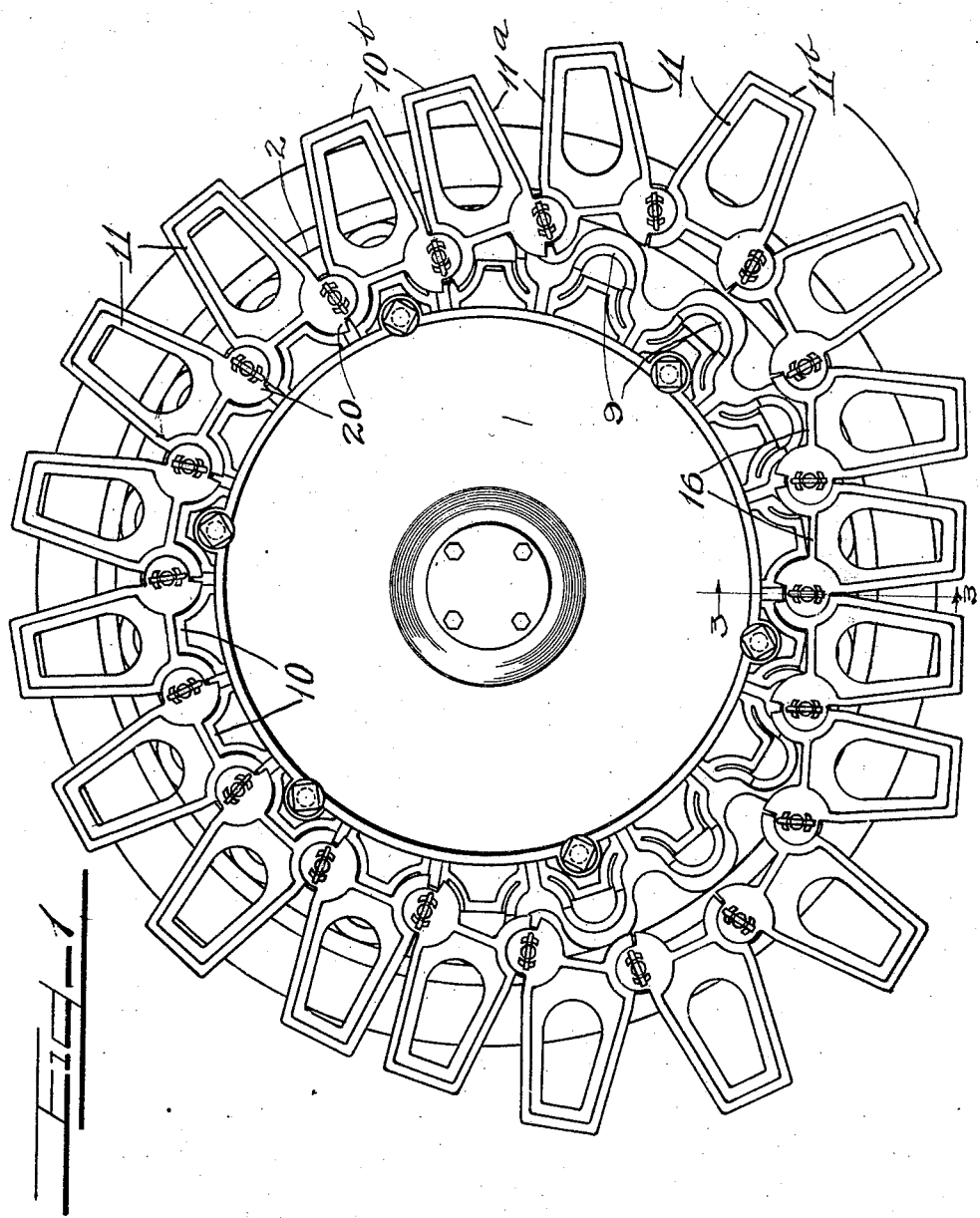

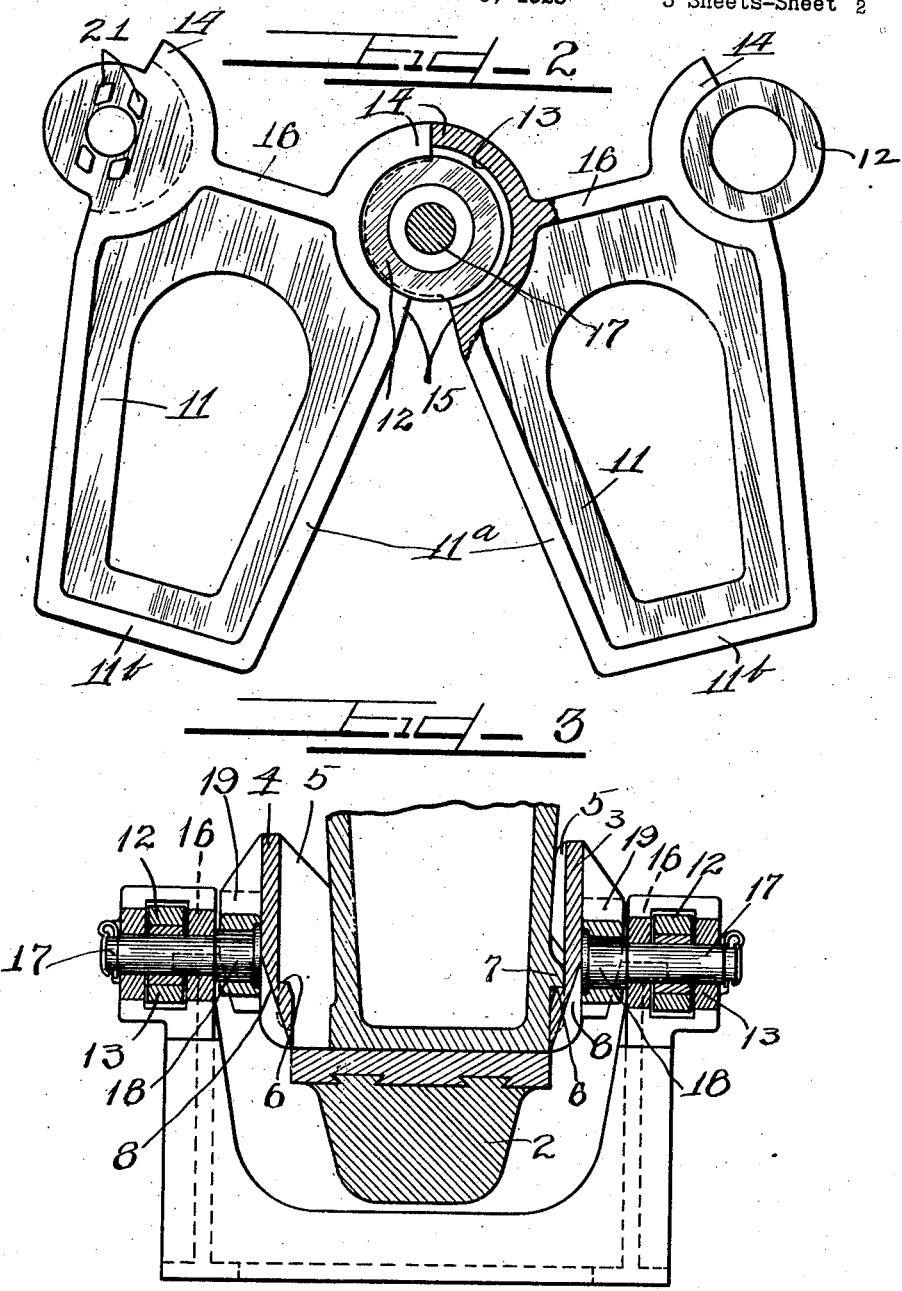

Patented Aug. 24, 1926.

1,597,454

UNITED STATES PATENT OFFICE.

ROYAL R. MILLER, OF CHICAGO, ILLINOIS, ASSIGNOR TO MILLER TRACTION TREAD COMPANY, OF CHICAGO, ILLINOIS, A CORPORATION OF DELAWARE.

TRACTOR WHEEL.

Application filed October 3, 1923. Serial No. 666,249.

This invention relates to a tractional tread for tractors or the like, adapted for attachment to the wheels for increasing the traction and affording a supporting means in soft or boggy soil.

It is an object of this invention to provide a tread comprising an endless member of pivotally connected traction elements having limited pivotal movements in order to maintain an advantageous alinement as the elements contact with the soil.

It is a further object of this invention to provide a tread having increased traction qualities in which the traction elements outnumber the supporting sockets or pockets, in which the pivotal movements of the elements are limited to avoid undue and injurious flexibility and in which the traction elements are properly guided and supported to maintain a proper relation with the supporting wheel.

With these and other objects in view, which will become more apparent in the following description and disclosures in the drawing, this invention comprises the novel mechanism and combinations hereinafter described and more particularly pointed out and defined in the appended claims.

In the accompanying drawings which illustrate a preferred embodiment of this invention and in which similar reference numerals refer to similar features in the different views:

Figure 1 is an elevational view of a wheel equipped with my improved tractional tread.

Figure 2 is an enlarged elevational view of a pair of tread elements with a part shown in section.

Figure 3 is an enlarged sectional view substantially upon the line 3—3 of Figure 1.

Figure 4 is a fragmentary elevational view of one of the tread supporting annuli showing the outer face thereof.

Figure 5 is an enlarged fragmentary elevational view of a tread supporting annulus showing the inner face thereof.

Figure 6 is an enlarged fragmentary top plan view of a pair of connected tread elements.

In referring now to the drawings, there is illustrated the standard disk wheel embodying the drum-like disk or web 1 upon which the tire 2 is supported. In carrying out this invention, a pair of sprocket rings 3 and 4 are bolted to the lateral faces of the disk.

The inner faces of these rings have radial ribs 5 (Figure 6) which space the rings a suitable distance from the web 1; the ribs on the ring 3 being narrower than those on ring 4. These sprocket rings are formed from the same pattern and are provided with annular shoulders or ledges 6; the shoulder on the ring 3 fitting over an annular shoulder or rib 7 on the web 1. The outer margins of these sprocket rings are beveled adjacent the sprocket recesses as indicated at 8 in order to guide the tread elements into the sprocket recesses.

The outer faces of the rings 3 and 4 are formed with sprocket teeth as shown in Figure 4. In the form shown, spaced teeth 9 are cast or secured upon the sides of the rings. These teeth have rounded or convex crests which give the tread elements a freely rolling motion and the teeth are so formed as to provide concave sprocket recesses therebetween into which the pivot rollers of the tread elements are adapted to dip or descend. Supporting ledges 10 are provided upon the annuli on a circle concentric with the sprocket teeth but spaced inwardly thereof. These ledges are just inside the sprocket teeth.

The tread comprises a series of connected tread elements 11 which have slightly tapered sides 11ª and outer traction surfaces 11ᵇ. Each tread element has tongues 12 upon one end and mortises 13 upon the other end, and stop flanges 14 extend inwardly from the tongues and mortises. The sides of the tread elements just outwardly beyond the pivot points as indicated at 15 have a less taper than the other parts so that the parts 15 are closer together and coact as outer stops to limit the movements of the tread elements toward each other. The inner surface of these tread elements between the tongues and mortises are in the form of ribs 16 which coact with the ledges 10 for supporting the tread elements upon the annuli.

In assembling these tread elements, the tongues 12 of one are inserted in the mortises 13 of the other, and bolts 17 passed through the walls of the mortises and tongues which are provided with suitable apertures to receive the same. Suitable bushings may be placed within the bearing apertures of the tongues as shown in Figure 3. These bolts are provided with enlarged bearing heads 18 upon which rollers 19 are mounted. Cotter pins 20 extend through the outer ends of these bolts and between lugs 21 upon the outer surfaces of the walls of the mortises as shown in Figures 3 and 6.

The tread elements 11 are connected together as just set forth forming as it were a sprocket chain or tractional tread. This tractional tread may be trained over the annuli or sprocket rings with the rollers positioned between the teeth, and the free ends secured together by bolts 17. The use of tongues and mortises to connect the tread elements produces a straight and even pull not otherwise attained.

In referring to Figure 1, it will be noted that the tread elements exceed the number of sprocket teeth on the rings. In the present instance, there are two more tread elements than sprocket teeth. Accordingly the tread elements will be forced outwardly away from the sprocket rings adjacent the points of contact with the ground; thuswise increasing the traction surface of the tractional tread. It will also be observed that the tread elements in contact with the ground are in substantially true vertical position on account of the coacting parts 15 which maintain them in such relative position and prevents objectional canting thereof, and the coacting stop flanges 14 prevent undue canting as the tread elements approach their contacting position with the ground. Accordingly, the traction elements will form proper contact with the ground when they come around. In general, these limiting stops 14 and 15 maintain sufficient rigidity of the tread for the best results and avoid the objectionable flexibility that prevents proper functioning of the tread elements. It should also be observed that the bulged parts of the tread adjacent the ground contacting links will be properly guided with respect to the sprocket rings by the beveled portions 8 with which the rollers may come in contact, and the ledges 10 cooperate with the ribs 16 on the tread elements for supporting the same, so as to lessen the wear upon the sprocket teeth.

I am aware that numerous details of construction may be varied through a wide range without departing from the principles of this invention, and I therefore do not purpose limiting the patent granted, otherwise than necessitated by the prior art.

I claim as my invention:

1. A tractional tread attachment for a wheel comprising a pair of sprocket rings attached to opposite side of the wheel and having recesses with lateral beveled approaches, and a tread comprising a series of pivotally connected tread elements trained over said rings and guided in its operation by said beveled approaches.

2. A tractional tread attachment for a wheel comprising a pair of sprocket rings attached to opposite sides of the wheel and having recesses with lateral inclined approaches, a tread member comprising a series of tread elements having limited pivotal connections with each other and having rollers coaxial with said pivotal connections, said rollers coacting with said sprocket rings.

3. The combination with a wheel having sprocket rings upon its sides said rings having supporting ledges, in combination with a tractional tread having rollers for engaging said rings and ribs for contacting with said ledges.

In testimony whereof I have hereunto subscribed my name.

ROYAL R. MILLER.